Aug. 11, 1925.

F. FERRIS 1,548,989

GOPHER TRAP ATTACHMENT

Filed April 9, 1925

INVENTOR
Frank Ferris.
BY
ATTORNEY

Patented Aug. 11, 1925.

1,548,989

UNITED STATES PATENT OFFICE.

FRANK FERRIS, OF CUMMINGS, KANSAS.

GOPHER-TRAP ATTACHMENT.

Application filed April 9, 1925. Serial No. 21,951.

*To all whom it may concern:*

Be it known that I, FRANK FERRIS, a citizen of the United States, residing at Cummings, in the county of Atchison and State of Kansas, have invented certain new and useful Improvements in Gopher-Trap Attachments; and I do declare the following to be a full, clear, and exact description of the invention, such as will enable others skilled in the art to which it appertains to make and use the same, reference being had to the accompanying drawings, and to the figures of reference marked thereon, which form a part of this application.

This invention relates to animal trap attachments, and the primary object is to provide an attachment especially designed to be applied to a gopher trap so that when the trap proper is "sprung", the attachment will be actuated to impale the animal on tines or prongs so that the escape of the animal will be prevented.

Gopher traps usually consist of two hinged jaw members actuated by a stout spring, the trap being sprung when a trigger mechanism releases the jaws. The trigger mechanism is actuated by the weight of the animal on a pan or blade usually containing the bait. There are certain characteristics in the habits of a gopher which must be recognized, the important one for the purpose of this invention being that the gopher comes out of the hole throwing dirt or earth ahead of it. This earth or dirt frequently accumulates on the bait pan at the entrance to the hole in sufficient quantities to cause the trap to be sprung before the animal is in position to be caught between the jaws. Of course after the trap is sprung the animal may easily make its escape.

My invention contemplates a trap attachment which may be secured to the jaws of the normal trap. The attachment is so constructed that it may be introduced into the entrance to the hole, slightly covered with earth, so that as the animal works its way to the mouth of the hole, it will work over the attachment, then if the normal trap is sprung, the attachment will be actuated, and since it carries impaling tines or pins, they will be forced into the body of the animal, resulting in its destruction.

The novelty of the invention will be clearly understood by reference to the following description in connection with the accompanying drawings in which Fig. 1 is a perspective view of a trap and an attachment combined, and constructed in accordance with my invention, the parts being shown in "set" position.

Figure 1:
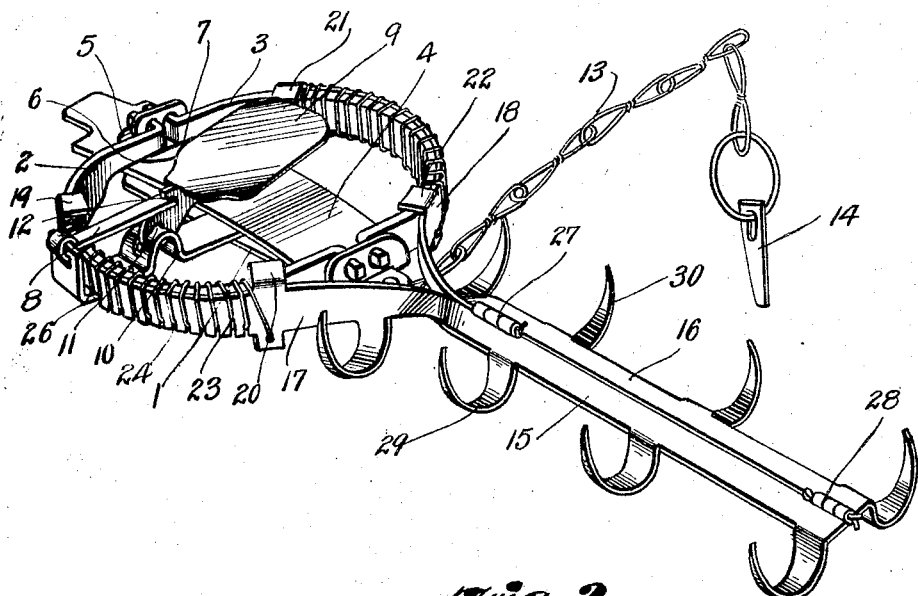

The normal trap consists of a base bar 1, two hinged jaws 2 and 3, a flat spring 4 having an opening 5, the edges of which bear against the lower edges 6 and 7 of the jaws 2 and 3, and a trigger mechanism consisting of the link 8 and the bait pan 9 hinged to the bar 10 at 11. The bait pan 9 has a notch 12 to receive the link or bar 8, so that when the parts are in the position shown in Figure 1, the two jaws are spread apart, but should the bait pan 9 be depressed by weight, the link 8 can no longer hold the jaw 2 in spread position, so the spring 4 will force the two jaws together. The trap is usually anchored by a chain 13 and a pin 14.

All of the construction thus far described generically embodies a well-known trap. The trap is usually placed at the entrance to the hole, the object being to permit the weight of the animal to trip the bait pan or blade 9, so as to allow the jaws 2 and 3 to snap together. It so happens, however, that as the animal works out of the hole, it throws dirt in advance so that the dirt accumulates on the pan 9, tripping it before the animal is in position to be caught, so that the efficiency of the trap is destroyed.

Figure 2:
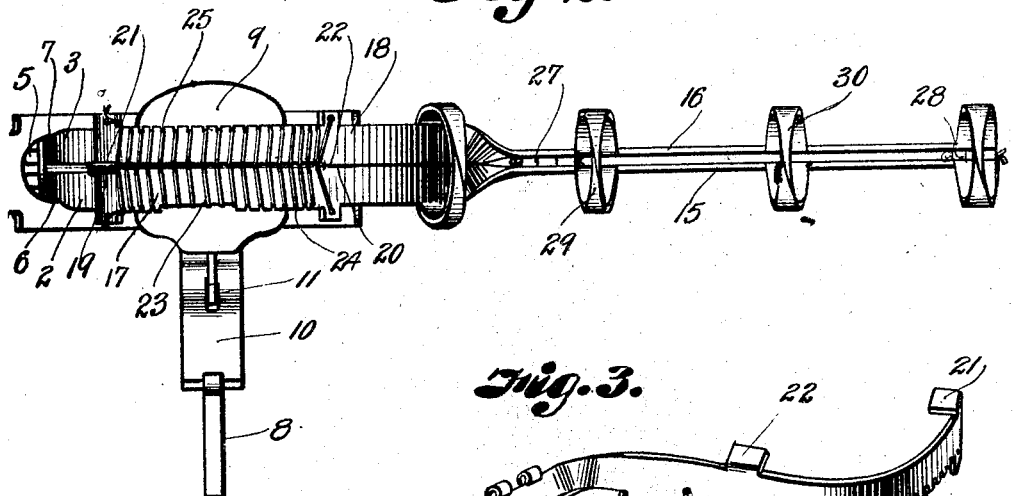
Fig. 2 is a plan view of the parts when the trap has been "sprung"
Figure 3:
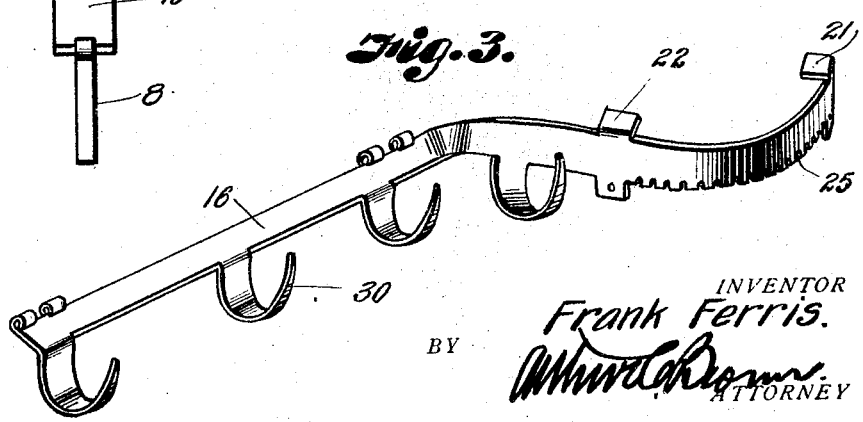
Fig. 3 is a detailed perspective view of one of the attachment bars.

My invention contemplates an attachment which will catch the animal while it is still in the hole. The attachment is illustrated as comprising two elongated bars 15 and 16, each having a curved end. The curved end 17 on bar 15 is attached to the jaw 2, and the curved end 18 on the bar 16 is attached to the jaw 3. This may be accomplished by providing the lugs 19 and 20 on curved end 17 to overlap the jaw 2, and lugs 21 and 22 on curved end 18 to overlap the jaw 3, and to secure the curved ends 17 and 18 to the jaws 2 and 3 by wires preferably passed through notches 24 and 25 at the edges of the curved ends 17 and 18. By reference to Figure 2 it will be observed that the jaw 2 and part of curved end 17 is cut away as at 26, to allow for the bar 10. The bars 15 and 16 are hinged together at 27 and 28, and their outer edges carry rows of impaling tines 29 and 30 which are curved upwardly so that when the two hinged bars 15 and 16 are swung together, the impaling tines 29 and 30 cooperate to grip the animal between them, and since the ends of the impaling pins or tines are sharp, the animal will be impaled upon the pins, that is, the tines will penetrate the body of the animal so that escape will be impossible. The bars 15 and 16 are introduced into the hole and preferably slightly covered with earth. Therefore it will be seen that as the animal throws the earth upon the member 9, the trap will be tripped or sprung where there is sufficient weight accumulation on the member 9. Should the weight of the earth be insufficient to spring the trap, then the animal will spring it when he passes over and presses upon the element 9, as he must do in coming out of the hole.

It will be apparent that the attachment may be easily applied to existing types of traps, and it will also be apparent that the attachment may be made as part of the original trap, should it be found expedient to so construct the trap. Therefore, I wish it to be understood that I do not limit myself to the exact details of construction shown, but reserve the right to make such changes in form, proportion, and minor details of construction as properly come within the scope of the appended claims.

What I claim and desire to secure by Letters-Patent is:

1. An attachment for traps comprising two hinged bars, each having a row of impaling tines at its outer edge, and outwardly curved end members for attachment to the jaws of a trap.

2. In combination, a trap having co-operating hinged jaws, an attachment therefor comprising two hinged bars having co-operating impaling tines on the outer edges, and means for securing the bars to the jaws of the trap.

3. An attachment for traps, comprising two hinged bars, each having a row of impaling tines at its outer edge, outwardly curved end members to lie against the jaws of a trap, lugs projecting inwardly from the curved end members to lie over the edges of the jaws, and means for securing the curved ends to the jaws of the trap.

4. An attachment for traps, comprising two hinged bars, each having a row of impaling tines at its outer edge, and outwardly curved members to lie against the jaws of a trap, the edges of the members being notched to receive fastening wires to be wound around the curved end members of the jaws of the trap.

5. The combination, a trap having co-operating hinged, spring-actuated jaws and an attachment therefor comprising two hinged bars, each having a row of impaling tines at its outer edge, and two outwardly curved end members lying flush against the outer faces of the jaws and secured thereto.

6. In combination, a trap having two hinged, spring-actuated jaws and an attachment therefor comprising two hinged bars having co-operating impaling tines on their outer edges, outwardly curved end members lying against the jaws of the trap, lugs on the end members overlapping the edges of the jaws, and means for securing the curved end members to the jaws of the trap.

In testimony whereof I affix my signature.

FRANK FERRIS.